Aug. 7, 1962     H. STREHLE     3,048,091

PHOTO-ELECTRIC EXPOSURE METER DEVICE

Filed Sept. 16, 1960     2 Sheets-Sheet 1

Inventor
HORST STREHLE
By Irvin S. Thompson
Attorney

Aug. 7, 1962 H. STREHLE 3,048,091
PHOTO-ELECTRIC EXPOSURE METER DEVICE
Filed Sept. 16, 1960 2 Sheets-Sheet 2

*Inventor*
HORST STREHLE
By *Irwin d. Thompson*
Attorney

United States Patent Office 3,048,091
Patented Aug. 7, 1962

3,048,091
PHOTO-ELECTRIC EXPOSURE METER DEVICE
Horst Strehle, Dresden, Germany, assignor to VEB Kamera- und Kinowerke Dresden, Dresden, Germany
Filed Sept. 16, 1960, Ser. No. 56,570
4 Claims. (Cl. 95—10)

The present invention relates to a photo-electric exposure measuring device with a jaw clamping the galvanometer pointer and a setting member exploring the position of the clamped galvanometer pointer.

In known constructions of this nature the means provided for the clamping of the galvanometer pointer are arranged separately from the exploring member which, as a result of additional mounting positions and structural parts, not only does not permit a compact style of construction but also renders the exposure measuring device more expensive. In a further embodiment the clamping means are suspended exclusively by means of springs on the exploring member, so that no accurate adaptation of the positions of the clamping and exploring means in relation to one another, necessary for exact clamping and exploring, can be achieved. This gives rise to incorrect exposures due to undesired, premature or delayed clamping of the galvanometer pointer.

The aim of the invention is the avoidance of these disadvantages by a more expedient construction of the clamping and exploring device.

In accordance with the invention this is achieved due to the fact that the setting member carries the clamping jaw, which is guided parallel with the direction of movement of the setting member and operatively coupled with the setting member by means of a clamping spring. The clamping jaw is preferably guided in a side piece of the setting member. As guide means however it is also possible to use the guide pins provided in any case already for the guidance of the setting member. According to a further feature of the invention the setting member has a stop member with which the clamping jaw comes into engagement on movement of the setting member away from the galvanometer pointer. The details of the invention may be seen from an illustrated and described example of embodiment, the exposure measuring device being used in the fully automatic control of a diaphragm.

Figure 1:
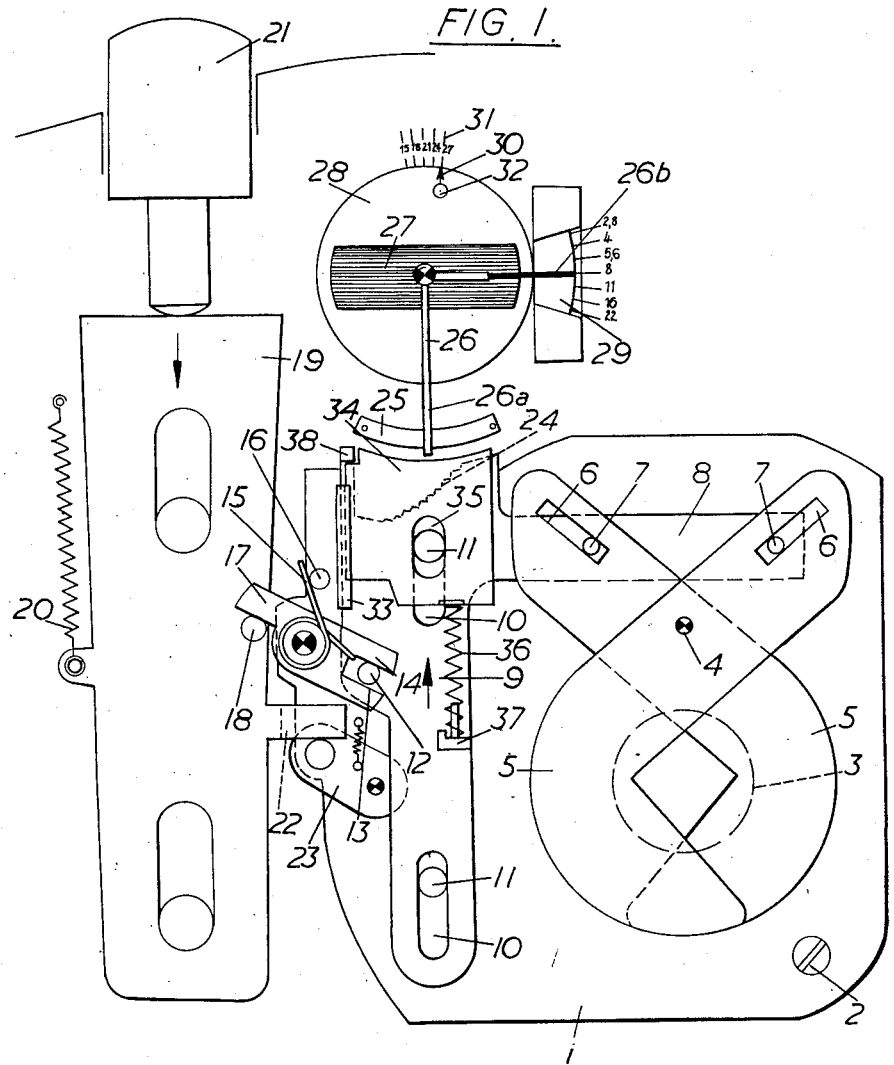
FIGURE 1 shows the exposure measuring device in the readiness position.
Figure 2:
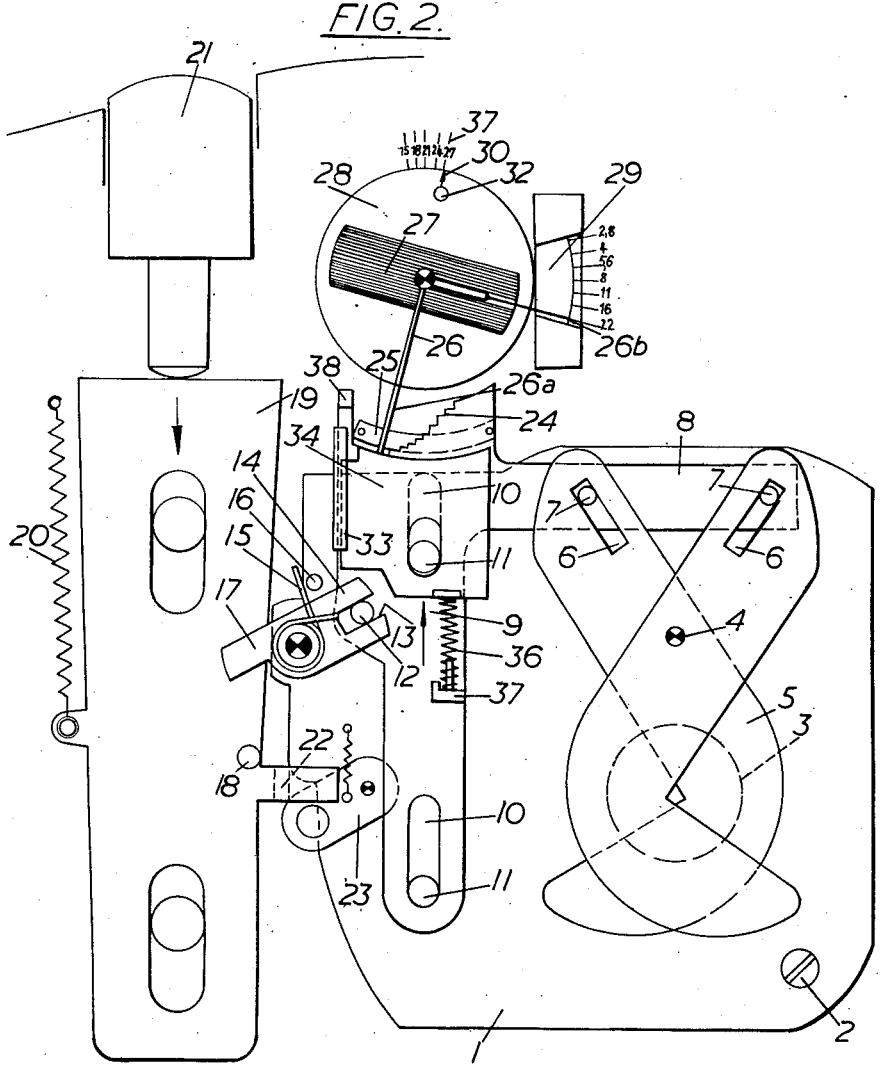
FIGURE 2 shows the exposure measuring device in the working position.

The shutter base plate 1 is secured by means of screws 2 in a camera housing (not shown). Over the light passage aperture 3 here lie the diaghragm blades 5 rotatable about the mounting pin 4, in the slots 6 of which blades there engage pins 7. The said pins 7 are secured on the arm 8 of the setting member 9, which is guided by means of pins 11 in slots 10, the pins 11 being mounted on the base plate. The pin 12 of the setting member 9 lies in a fork 13 of the transmission lever 14, which is supported through the drive spring 15 on the pin 16 fast with the housing. Through the arm 17 the transmission lever 14 is connected with the pin 18 of the camera release 19, on which the return spring 20 is secured. The return spring 20 is made stouter than the drive spring 15. For the movement of the camera release 19 there serves the release knob 21. The lug 22 bent away from the camera release 19 is in engagement with the shutter release 23.

In the setting member 9 there is worked the stepped cam path 24. Opposite this cam path there swings along a support rail 25 the end of meter stop 26a of the pointer 26, which is connected with the moving coil 27 of a measuring mechanism 28. The other end or indicating pointer 26b is visible in a window 29 provided with diaphragm values. The entire measuring mechanism 28 is rotatably mounted and possesses a mark 30, opposite which there is arranged a scale 31 with values for film sensitivities.

The setting member 9 is formed with the side piece 33, in which the clamping jaw 34 is guided. Through a slot 35 of the clamping jaw 34 there extends the guide pin 11. The clamping spring 36 supported on the projection 37 fast with the housing seeks to press the clamping jaw 34 against the stop member 38 formed on the setting member 9.

The manner of operation of the device is as follows:

Firstly, the kind of film inserted is set by rotation of the measuring mechanism 28 by means of the scale 31 with values for film sensitivities, and the mark 30. If then on aiming at an object of which a picture is to be taken the end 26b of the meter pointer 26 is visible in the free range of the window 29 provided with the diaphragm scale, an exposure can be effected. If the pointer end 26b is not visible, the diaphragm range available is not sufficient for the taking of a properly exposed picture.

For the purpose of release of the shutter the release knob 21 is depressed. Consequently, the camera release 19 is shifted against the action of the return spring 20. The pin 18 then departs from the arm 17 of the transmission lever 14, so that the drive spring 15 can rotate the said transmission lever 14 in the counter-clockwise direction. The setting member 9, together with the clamping jaw 34, is shifted in the direction of the arrow through the pin 12 by the fork 13 of the transmission lever 14. As soon as the clamping jaw 34 strikes the end 26a of the galvanometer pointer 26 it no longer rests on the stop member 38 as the member 38 along with the setting member 9, continues to move in the direction of the arrow. Jaw 34, during the further movement of the setting member 9 as a result of the clamping spring 36, prevents the galvanometer pointer 26 from carrying out any movement, so that the setting member 9 can place itself with its cam path 24 on the end 26a of the meter pointer 26, which end is secured against springing away. According to the position of the pointer 26 the setting member 9 is displaced more or less far, so that through the pins 7 arranged on the arm 8, the diaphragm blades 5 cover more or less of the light passage aperture 3. Finally, the lug 22 rotates the shutter release 23, whereby the exposure operation is initiated.

Obviously the rotation of the measuring mechanism 28 can also be utilized to take into consideration different exposure times. For this purpose the pin 32 is expediently coupled with an exposure time setting member (not separately illustrated). The film sensitivities are then preferably taken into consideration by relative adjustment in relation to the exposure time setting member.

Finally, it should also expressly be mentioned that the object of the invention is suitable both for exposure measuring devices which serve for the automatic setting of one or more exposure factors such as diaphragm and exposure time, or merely for the indication of exposure values, as is the case above all in hand exposure meters.

I claim:

1. In a photographic camera having a housing, a shutter device including an apperture diaphragm mounted on the housing, a shutter operating mechanism, a photo-electric moving coil exposure meter, and an indicating pointer attached to the moving-coil, which pointer moves over a scale provided on the housing; the provision of a meter stop connected to the moving-coil, exposure factor setting means operatively connected to the aperture diaphragm and slidably mounted in the housing so as to be substantially rectilinearly movable towards the meter stop, which means is provided with a stepped cam to abut against the meter stop when the setting means is moved toward said meter stop, the setting means position when abutting against the meter stop depending upon the position of the latter, a drive spring connected between the housing and the setting means for urging the latter towards the meter stop, a camera release member operably connected to the shutter operating mechanism, a return spring connected to the camera release member to oppose operation of the release member, a transmission member coupled between the camera release member and the setting means in such a manner that the return spring is able to overcome the drive spring and to urge the setting means away from the meter stop when the camera release member is unoperated, while allowing the setting means to move toward the meter stop, under the action of the drive spring, upon operation of the camera release member, a clamping jaw slidably mounted on the setting means, said jaw being spring urged in the direction towards the meter stop, said jaw being disposed to clamp the meter stop on movement of the setting means towards the meter stop before the stepped cam abuts the meter stop, said jaw clamping the meter stop under the action of its spring on further movement of the setting means towards the meter stop to abut the stepped cam against the meter stop.

2. In a photographic camera having a housing, a shutter device including an aperture diaphragm mounted on the housing, a shutter operating mechanism, a photo-electric moving-coil exposure meter, and an indicating pointer attached to the moving-coil, which pointer moves over a scale provided on the housing; the provision of a meter stop connected to the moving-coil, exposure factor setting means operatively connected to the aperture diaphragm and slidably mounted in the housing so as to be substantially rectilinearly movable towards the meter stop, which means is provided with a stepped cam to abut against the meter stop when the setting means is moved toward said meter stop, the setting means position when abutting against the meter stop depending upon the position of the latter, a drive spring connected between the housing and the setting means for urging the latter towards the meter stop, a camera release member operably connected to the shutter operating mechanism, a return spring connected to the camera release member to oppose operation of the release member, a transmission member coupled between the camera release member and the setting means in such a manner that the return spring is able to overcome the drive spring and to urge the setting means away from the meter stop when the camera release member is unoperated, while allowing the setting means to move toward the meter stop, under the action of the drive spring, upon operation of the camera release member, a clamping jaw slidably mounted on the setting means, a side piece formed on the setting means and arranged to guide the clamping jaw, said jaw being spring urged in the direction towards the meter stop, said jaw being disposed to clamp the meter stop on movement of the setting means towards the meter stop before the stepped cam abuts the meter stop, said jaw clamping the meter stop under the action of its spring on further movement of the setting means towards the meter stop to abut the stepped cam against the meter stop.

3. In a photographic camera having a housing, a shutter device including an aperture diaphragm mounted on the housing, a shutter operating mechanism, a photo-electric moving-coil exposure meter, and an indicating pointer attached to the moving-coil, which pointer moves over a scale provided on the housing; the provision of a meter stop connected to the moving-coil, exposure factor setting means operatively connected to the aperture diaphragm and slidably mounted in the housing so as to be substantially rectilinearly movable towards the meter stop, which means is provided with a stepped cam to abut against the meter stop when the setting means is moved toward said meter stop, the setting means position when abutting against the meter stop depending upon the position of the latter, a drive spring connected between the housing and the setting means for urging the latter towards the meter stop, a camera release member operably connected to the shutter operating mechanism, a return spring connected to the camera release member to oppose operation of the release member, a transmission member coupled between the camera release member and the setting means in such a manner that the return spring is able to overcome the drive spring and to urge the setting means away from the meter stop when the camera release member is unoperated, while allowing the setting means to move toward the meter stop, under the action of the drive spring, upon operation of the camera release member, a clamping jaw slidably mounted on the setting means, a guide pin attached to the housing and arranged to guide both the setting means and the clamping jaw, said jaw being spring urged in the direction towards the meter stop, said jaw being disposed to clamp the meter stop on movement of the setting means towards the meter stop before the stepped cam abuts the meter stop, said jaw clamping the meter stop under the action of its spring on further movement of the setting means towards the meter stop to abut the stepped cam against the meter stop.

4. In a photographic camera having a housing, a shutter device including an aperture diaphragm mounted on the housing, a shutter operating mechanism, a photo-electric moving-coil exposure meter, and an indicating pointer attached to the moving-coil, which pointer moves over a scale provided on the housing; the provision of a meter stop connected to the moving-coil, exposure factor setting means operatively connected to the aperture diaphragm and slidably mounted in the housing so as to be substantially rectilinearly movable towards the meter stop, which means is provided with a stepped cam to abut against the meter stop when the setting means is moved toward said meter stop, the setting means position when abutting against the meter stop depending upon the position of the latter, a drive spring connected between the housing and the setting means for urging the latter towards the meter stop, a camera release member operably connected to the shutter operating mechanism, a return spring connected to the camera release member to oppose operation of the release member, a transmission member coupled between the camera release member and the setting means in such a manner that the return spring is able to overcome the drive spring and to urge the setting means away from the meter stop when the camera release member is unoperated, while allowing the setting means to move toward the meter stop, under the action of the drive spring, upon operation of the camera release member, a clamping jaw slidably mounted on the setting means, a stop member formed on said setting means, said jaw being spring urged against said stop member and in the direction towards the meter stop, said jaw being disposed to clamp the meter stop on movement of the setting means towards the meter stop before the stepped cam abuts the meter stop, said jaw clamping the meter stop under the action of its spring on further movement of the setting means towards the meter stop to abut the stepped cam against the meter stop.

References Cited in the file of this patent
UNITED STATES PATENTS

| | | |
|---|---|---|
| 2,058,531 | Tuttle | Oct. 27, 1936 |
| 2,923,216 | Greger | Feb. 2, 1960 |
| 2,940,046 | Herterich | June 7, 1960 |
| 2,952,199 | Burger | Sept. 13, 1960 |